US012264649B2

(12) United States Patent
McIlvaine

(10) Patent No.: US 12,264,649 B2
(45) Date of Patent: Apr. 1, 2025

(54) SINGLE AND TWIN TURBINE FLUID STREAM ENERGY COLLECTION AND CONVERSION DEVICES

(71) Applicant: Clifford J. McIlvaine, St. Charles, IL (US)

(72) Inventor: Clifford J. McIlvaine, St. Charles, IL (US)

( * ) Notice: Subject to any disclaimer, the term of this patent is extended or adjusted under 35 U.S.C. 154(b) by 0 days.

(21) Appl. No.: 18/668,723

(22) Filed: May 20, 2024

(65) Prior Publication Data

US 2024/0301861 A1 Sep. 12, 2024

Related U.S. Application Data

(63) Continuation-in-part of application No. 18/178,699, filed on Mar. 6, 2023, now Pat. No. 11,988,197.

(51) Int. Cl.
| | | |
|---|---|---|
| *F03D 3/04* | (2006.01) | |
| *F03D 3/06* | (2006.01) | |
| *F03D 9/12* | (2016.01) | |
| *F03D 9/25* | (2016.01) | |
| *F03D 9/32* | (2016.01) | |

(52) U.S. Cl.
CPC ............. *F03D 3/04* (2013.01); *F03D 3/06* (2013.01); *F03D 9/12* (2016.05); *F03D 9/25* (2016.05); *F03D 9/32* (2016.05); *F05B 2220/706* (2013.01)

(58) Field of Classification Search
CPC ..... F03D 3/04; F03D 3/06; F03D 9/12; F03D 9/25; F03D 9/32; F05B 2220/706
USPC ............... 415/1; 290/42, 43, 44, 53, 54, 55
See application file for complete search history.

(56) References Cited

U.S. PATENT DOCUMENTS

| | | | | |
|---|---|---|---|---|
| 2,360,791 | A | | 10/1944 | Cosslett |
| 3,720,840 | A | | 3/1973 | Gregg |
| 4,047,833 | A | * | 9/1977 | Decker ............... F03D 9/25 |
| | | | | 415/4.4 |
| 4,057,270 | A | | 11/1977 | Lebost |
| 4,070,131 | A | | 1/1978 | Yen |
| 4,079,264 | A | * | 3/1978 | Cohen ............... F03D 1/04 |
| | | | | 415/4.4 |

(Continued)

OTHER PUBLICATIONS

Notification of Transmittal of the International Search Report and the Written Opinion of the International Searching Authority (Forms PCT/ISA/220, PCT/ISA/210, and PCT/ISA/237) issued on May 24, 2024, by the European Patent Office in International Application No. PCT/US2024/016818. (10 pages).

*Primary Examiner* — Charles Reid, Jr.
(74) *Attorney, Agent, or Firm* — BUCHANAN INGERSOLL & ROONEY PC

(57) ABSTRACT

A fluid turbine assembly includes a circular housing, one or more turbines placed inside the housing and configured to rotate about a rotational axis, the turbine including a rotor and a plurality of blades which protrude from an outer surface of the rotor, a funnel assembly configured to collect and compress fluid stream energy through a fluid inlet opening, and an intake ducting part of the funnel configured to direct the collected fluid stream energy into the housing and toward the turbine blades in a first direction, and to direct the collected fluid stream energy into the housing and toward the turbine blades in a second direction opposite the first direction at the same time. The funnel is configured to rotate on the same axis independently of the turbine blades.

14 Claims, 17 Drawing Sheets

(56) References Cited

U.S. PATENT DOCUMENTS

| | | | |
|---|---|---|---|
| 4,127,356 A | 11/1978 | Murphy | |
| 4,350,900 A | 9/1982 | Baughman | |
| 4,398,096 A | 8/1983 | Faurholtz | |
| 4,406,579 A | 9/1983 | Gilson | |
| 4,433,552 A | 2/1984 | Smith | |
| 4,609,827 A * | 9/1986 | Nepple | F03D 3/068 |
| | | | 416/111 |
| 4,718,822 A * | 1/1988 | Riezinstein | F03D 7/06 |
| | | | 416/139 |
| 5,083,899 A | 1/1992 | Koch | |
| 5,977,649 A | 11/1999 | Dahill | |
| 6,057,606 A * | 5/2000 | Porat | A01G 15/00 |
| | | | 290/55 |
| 7,632,070 B2 * | 12/2009 | Dawson | F03D 7/0236 |
| | | | 415/4.1 |
| 8,063,502 B1 | 11/2011 | Voyles | |
| 8,067,852 B2 | 11/2011 | Ortiz et al. | |
| 8,207,625 B1 | 6/2012 | Cristo | |
| 8,222,762 B2 | 7/2012 | Borgen | |
| 8,853,881 B2 | 10/2014 | Andrews Hoegg | |
| 10,669,935 B2 | 6/2020 | Kayara | |
| 2005/0201855 A1 | 9/2005 | Fan | |
| 2006/0108809 A1 | 5/2006 | Scalzi | |
| 2007/0241567 A1 | 10/2007 | Platt | |
| 2008/0061559 A1 * | 3/2008 | Hirshberg | F03D 9/32 |
| | | | 415/176 |
| 2008/0303287 A1 | 12/2008 | Meheen | |
| 2009/0160195 A1 | 6/2009 | Culjak | |
| 2009/0230691 A1 | 9/2009 | Presz et al. | |
| 2009/0256442 A1 * | 10/2009 | Stiesdal | F03D 9/25 |
| | | | 310/90 |
| 2010/0230973 A1 | 9/2010 | Ortiz et al. | |
| 2012/0068466 A1 | 3/2012 | Gilbert | |
| 2012/0074705 A1 | 3/2012 | Stephens et al. | |
| 2012/0175882 A1 * | 7/2012 | Sterling | F03D 1/04 |
| | | | 290/55 |
| 2012/0228965 A1 * | 9/2012 | Bang | H02K 21/12 |
| | | | 310/156.02 |
| 2013/0001951 A1 | 1/2013 | Tai et al. | |
| 2014/0339944 A1 * | 11/2014 | Esakov | H02K 3/28 |
| | | | 310/195 |
| 2015/0108758 A1 | 4/2015 | Oakes et al. | |
| 2015/0240786 A1 | 8/2015 | Dietzel | |
| 2016/0084227 A1 | 3/2016 | Krippene | |
| 2023/0193877 A1 * | 6/2023 | Yan | F03D 9/12 |
| | | | 290/55 |

\* cited by examiner

SINGLE AND TWIN TURBINE FLUID STREAM ENERGY COLLECTION AND CONVERSION DEVICES

CROSS REFERENCE TO RELATED APPLICATIONS

The present application is a continuation-in-part of U.S. patent application Ser. No. 18/178,699, which was filed on Mar. 6, 2023. The entire contents of U.S. patent application Ser. No. 18/178,699 is incorporated herein by reference.

FIELD OF THE INVENTION

The present invention relates generally to single and multiple turbine devices which collect and convert fluid stream energy into usable electrical and mechanical energy.

BACKGROUND

Over the years, a number of approaches have been taken around the world to produce large amounts of clean, low cost pollution-free electrical and mechanical energy around the world, in all environmental conditions, to reduce and/or eliminate the use of dirty fossil fuels which are known to cause pollution and health problems. Such approaches have not fully solved the problems of collecting and converting wind, water, and solar energies into usable electrical and mechanical energies.

There is a tremendous need for simple, reliable, pollution free, environmentally safe energy collection and conversion systems that do not kill birds, fish or other living things, plus be able to operate any place in the world under any weather conditions. The present invention can operate in severe weather conditions when the winds blow at 100 miles per hour or more, which is an efficient time to collect and convert wind energy into electrical and mechanical energy, especially when the grid power is down and power is needed to run various devices to survive the storm. The present invention solves many of these problems by keeping the devices simple and efficient for clean energy collection and conversion under a broad range of weather conditions and with applications such as powering batteries, vehicles, homes, larger buildings and factories. The devices can be mass produced, can also be used for hydroelectric energy production, and they are scalable.

SUMMARY

Devices according to the present application may be designed to typically operate from 5 to 175 miles per hour winds or more under all weather conditions around the world. As such, turbine rotors for these devices are built with a very heavy solid mass of material, such as stainless steel, cast iron, steel, lead, concrete, glass, or similar such materials. This heavy mass of the main turbine rotor needs to spin at very high revolutions per minute in order to store usable kinetic energy; therefore, each rotor should be precision balanced to prevent premature failure.

The devices use special low friction magnetic bearings which do not require any conventional lubrication oil. This allows the devices to operate from minus 60 degrees Fahrenheit to plus 150 degrees Fahrenheit under all weather humidity conditions. Conventional oil lubricated bearings can also be used under moderate temperature conditions.

Devices according to the present application can generate electricity by incorporating the generator into the turbine itself. A stacked version can effectively double the generator speed under the same wind conditions.

DETAILED DESCRIPTION

Set forth below with reference to the accompanying drawings is a detailed description of embodiments of single and twin turbine fluid stream energy collection and conversion devices.

Figure 1:
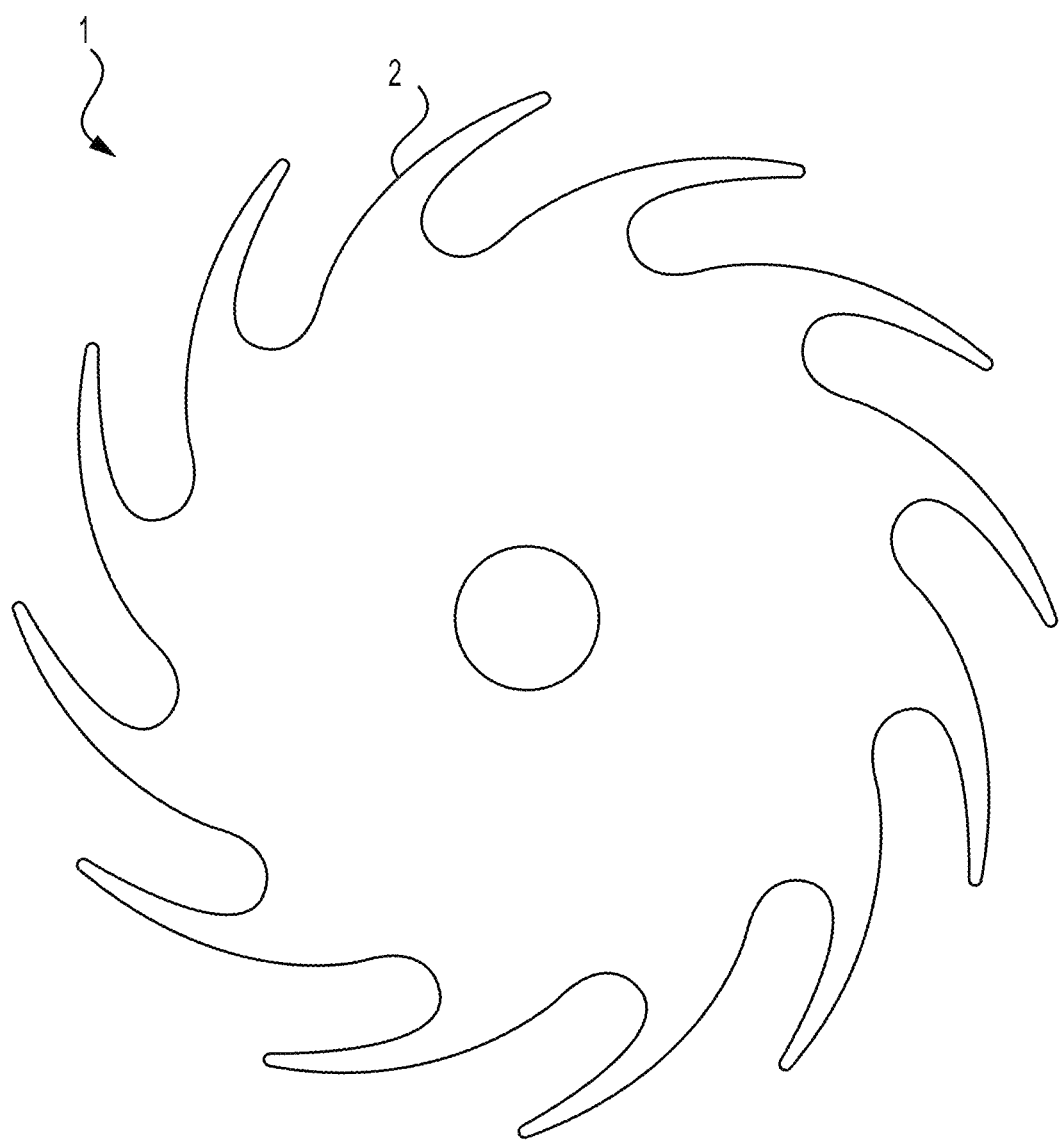
FIG. 1 is a top view of a turbine rotor according to exemplary embodiments of the present application.

FIG. 1 illustrates a top view of a turbine rotor 1 usable with devices according to the present application. The turbine rotor 1 is designed with special tall curved rotor blades 2. The turbine rotor 1 can be scaled up or down for different uses, with the blades 2 remaining the full height of the turbine rotor 1. In the illustrated example, there are twelve blades 2, but this can of course vary depending on the specific application. As discussed in detail below, the turbine rotor blades 2 are configured to collect fluid stream energy continuously around the circular surface at the same time for maximum mechanical energy transfer to the spinning rotor 1.

Figure 2:
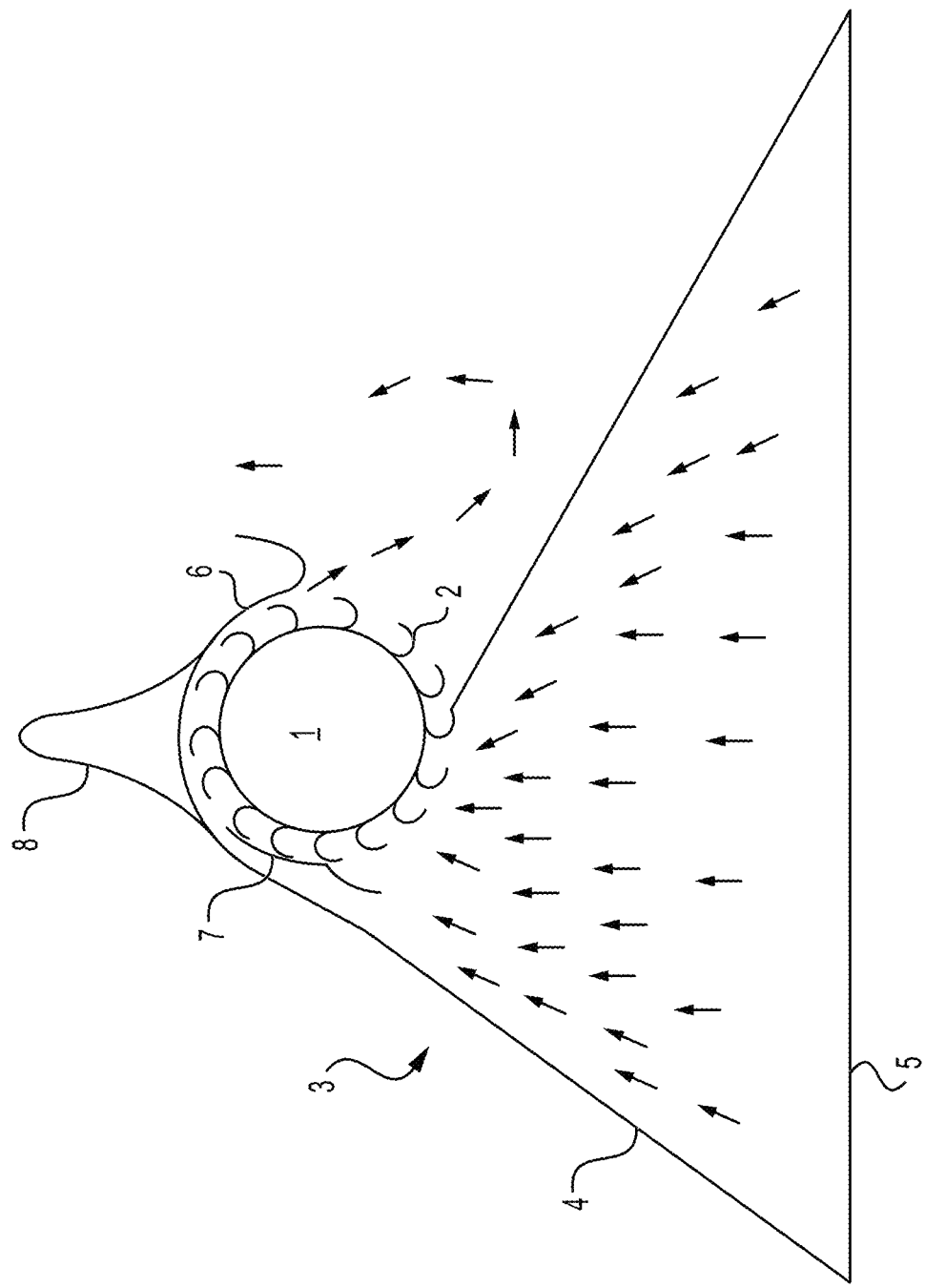
FIG. 2 is a cutaway top view of a single turbine assembly according to an embodiment of the present application.

FIG. 2 illustrates a cutaway top view of a single turbine embodiment including a large main funnel and circular housing assembly 3 that is constructed with fiberglass, carbon fiber or other molded super strong plastic materials for light weight, but can be made of heavy metal. Even though the main funnel 4 is constructed of very strong materials, the main funnel 4 is so large, it may not be strong enough to withstand high interruptible pressure volume fluid stream energy conditions without incorporating a structural grid 5 at the front surface face of the funnel, which may be a 2 inch grid.

Various wind conditions where the wind starts and stops all the time cause interruptible conditions of the fluid stream energy, producing extra stress. To compensate for the additional stress on the collection elements, embodiments are configured to automatically reduce the surface area of the collection funnel. In particular, the main funnel 4 can incorporate an attached extended funnel which automatically adjusts its surface area size to pre-determined settings for varying strong wind/fluid stream conditions, including start-stop interruptible, low-, and high-pressure wind conditions. Such extended funnel may incorporate movable panels which fold back (origami technique) or slide back, and a flexible sail with a surface which can fold or roll back in high pressure wind/fluid stream conditions; all these ways change the collection surface area, which reduces the stress on the funnel.

Figure 11:
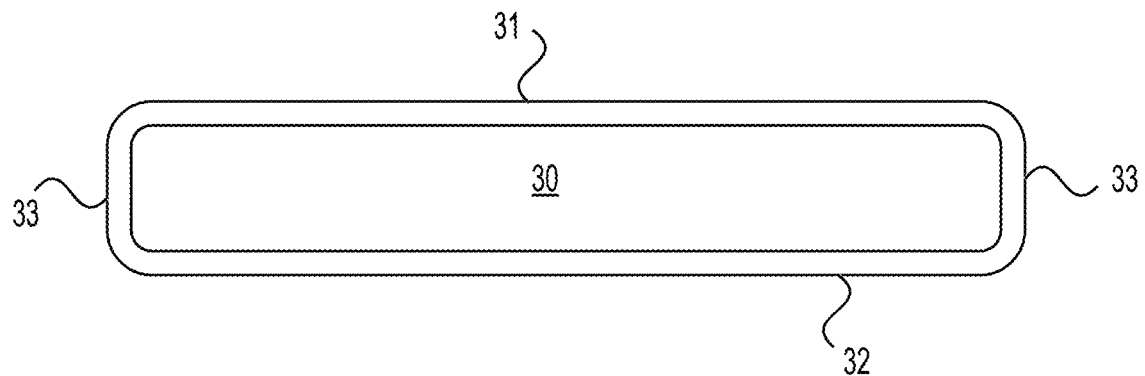
FIG. 11 is a top view of a center cavity of a fixed funnel side wall.

FIG. 11 illustrates a center pocket 30 disposed in one of the fixed funnel side walls which will hold the sliding movable panels. Although only one is illustrated, in an embodiment the four walls defining a fixed funnel will have such a center pocket 30 with sliding movable panels therein. In the FIG. 11 top view, the center pocket 30 is defined by outside wall 31, inside wall 32, and side walls 33.

Figure 12:
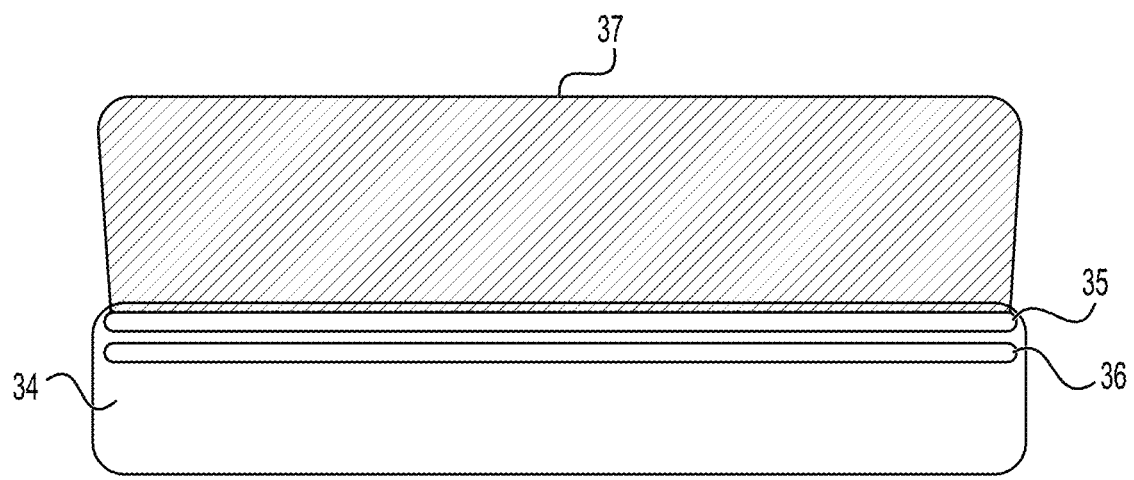
FIG. 12 is a front view of fixed funnel side view with movable panels in the center cavity.

FIG. 12 is a front view of a fixed funnel wall 34 with first and second movable panels 35 and 36 disposed therein, in which approximately one foot wide flap part 37 of the extendable funnel movable panels 35 and 36 is visible. In the FIG. 12 view, the top flap part 37 overlies the flap part of the second movable panel (not shown). The first and second movable panels 35 and 36 are spring loaded to retract into the center pocket 30 in high wind conditions via pressure on the flap parts which face the fluid stream.

Figure 13:
FIG. 13 is an end view of the movable panels.
Figure 14:
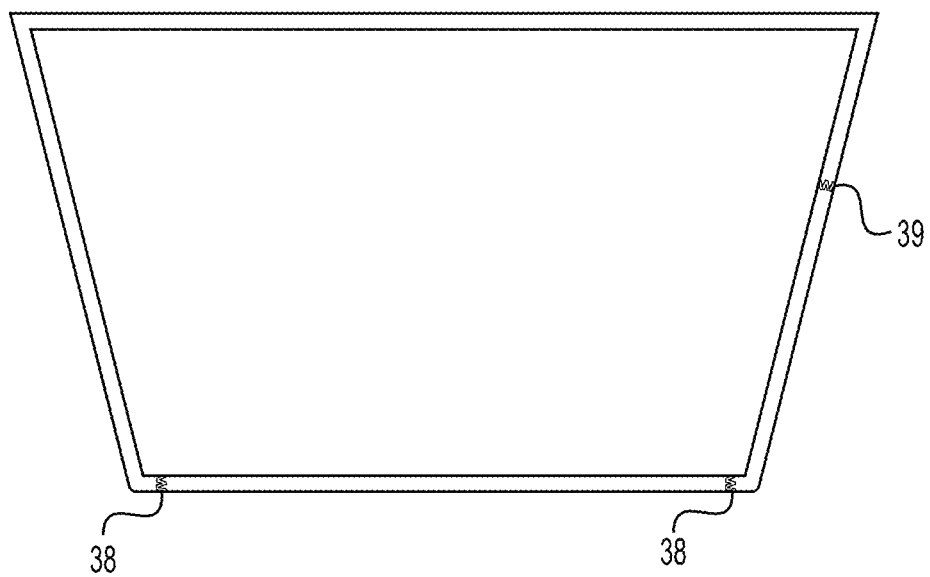
FIG. 14 is a front side cutaway view of the movable panels inside the center pocket.

FIG. 13 is an end view of the movable panels, with the bottom springs 38 that cause the movable panels to be spring loaded on the bottom visible. FIG. 14 is a front side cutaway view of the movable panels inside the center cavity. In addition to both panels being spring loaded at the bottom, one of the panels is spring loaded on the left side, and the other is spring loaded on the right side. One of the side springs 39 is visible in the figure. With this arrangement, in low wind conditions, the panels expand sideways and up and down at the same time, to increase their surface area and collect more fluid stream energy.

Figure 15:
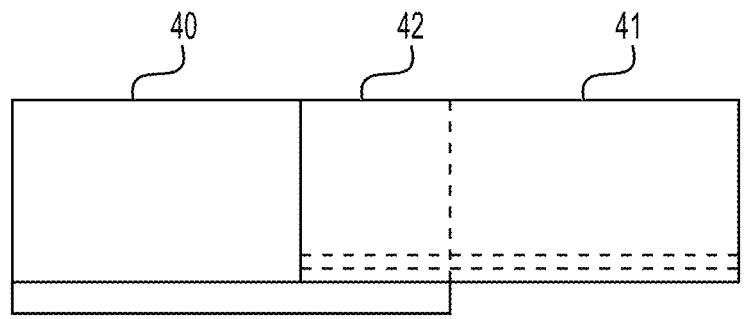
FIG. 15 is a top view looking down of the panels when extended.
Figure 16:
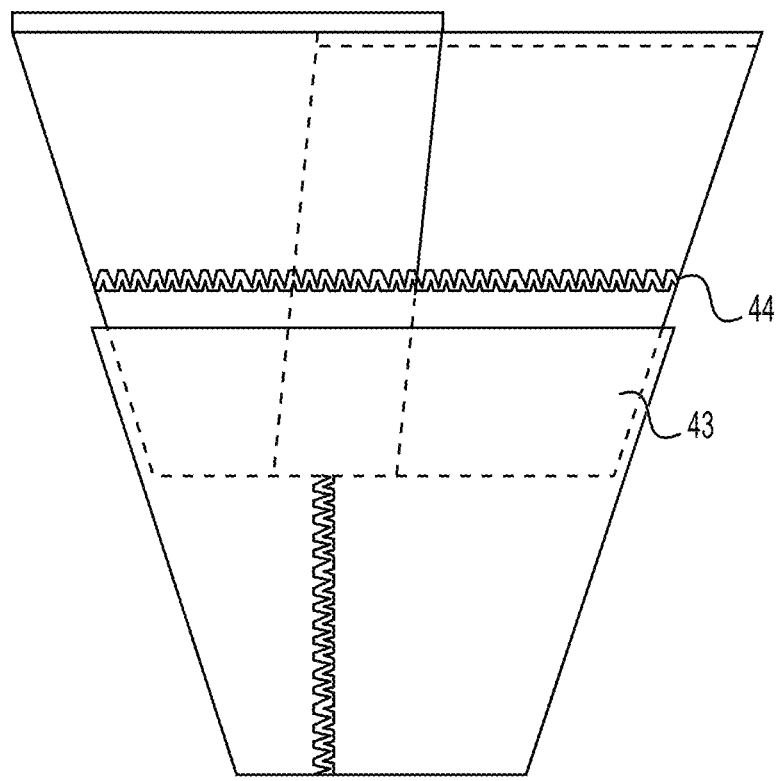
FIG. 16 is a front view of the extended panel arrangement.
Figure 17:
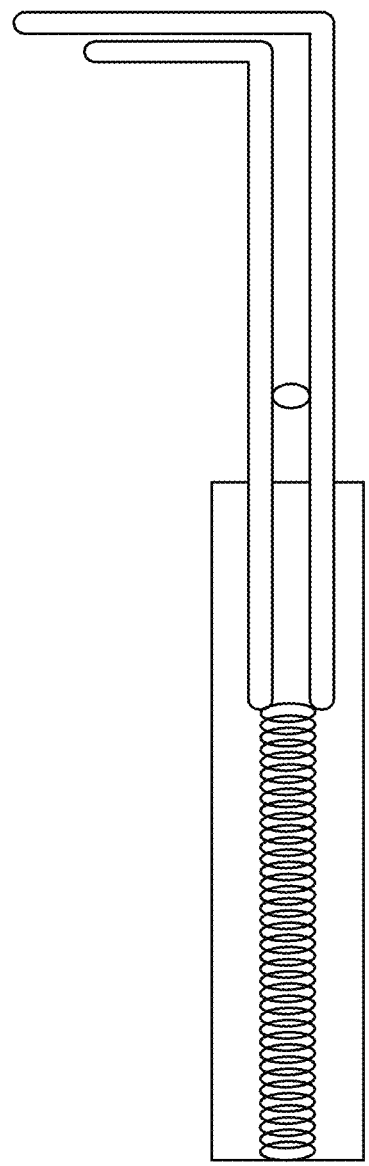
FIG. 17 is a side view of the extended panel arrangement.

FIG. 15 is a top view looking down of the panels when extended. As seen in the figure, when extended, there is a left panel and a right panel because they are biased in opposite left and right directions. The left panel flap 40 and right panel flap 41 remain overlapped in an overlap area 42 by about ⅓ their total width. Furthermore, as shown in the FIG. 16 front view of the extended panel arrangement, the panels remain within the cavity of the fixed funnel 43 by about ⅓ their total height. Also visible in that figure is a guide channel 44 built into each panel with tension spring force so that they expand left and right, which can be used in addition to or instead of the bottom springs. Additionally, FIG. 17 is a side view of the extended panel arrangement.

The main funnel 4 is configured with ducting walls 7, which are part of the circular housing funnel assembly 3 which collects, directs, separates, compresses, and recombines in opposite direction the fluid stream energy about 300 degrees around either a single turbine rotor or a twin turbine rotor assembly (discussed in detail below) in a continuous smooth fluid stream pathway around and impinging on the rotor blades 2. This fluid stream starts out in one direction, normally on the left side of the main funnel 4 for a first rotation direction, and ends up exiting the circular housing assembly 3 on the right side front rear of the funnel in the opposite direction, 180 degrees from where it was collected.

For additional efficiency, a very large protrusion 8 on the top and rear of the circular housing assembly 3 is provided to cause the funnel front to always face directly into the fluid stream (for example, the wind stream). Furthermore, a super slippery embedded coating (PTFE or the like substance) on the surface of the funnel 4, circular housing 6 and ducting walls 7 may be used to reduce friction on all the critical surfaces.

In addition, as discussed in detail below, the rotational axis allows the turbine rotor 1, main funnel 4, and the circular housing 6 to rotate independently of each other if necessary. Normally the main funnel 4 and circular housing 6 are molded together to form assembly 3, and rotate as a unit around the rotational axis independently of the turbine rotor 1. In particular, the main funnel 4 pivots on the rotational axis using separate magnetic bearings; at the same time, the turbine rotor 1 also pivots on the rotational axis at a different pivot point using its own magnetic bearings independent of the funnel. Each separate function has its own pivot point on the rotational axis, and its own magnetic bearings. Standard oil bearings can be used at reduced life and efficiency, It is also possible to have additional different functions moving around the rotational axis independent of each other at the same time.

Figure 3:
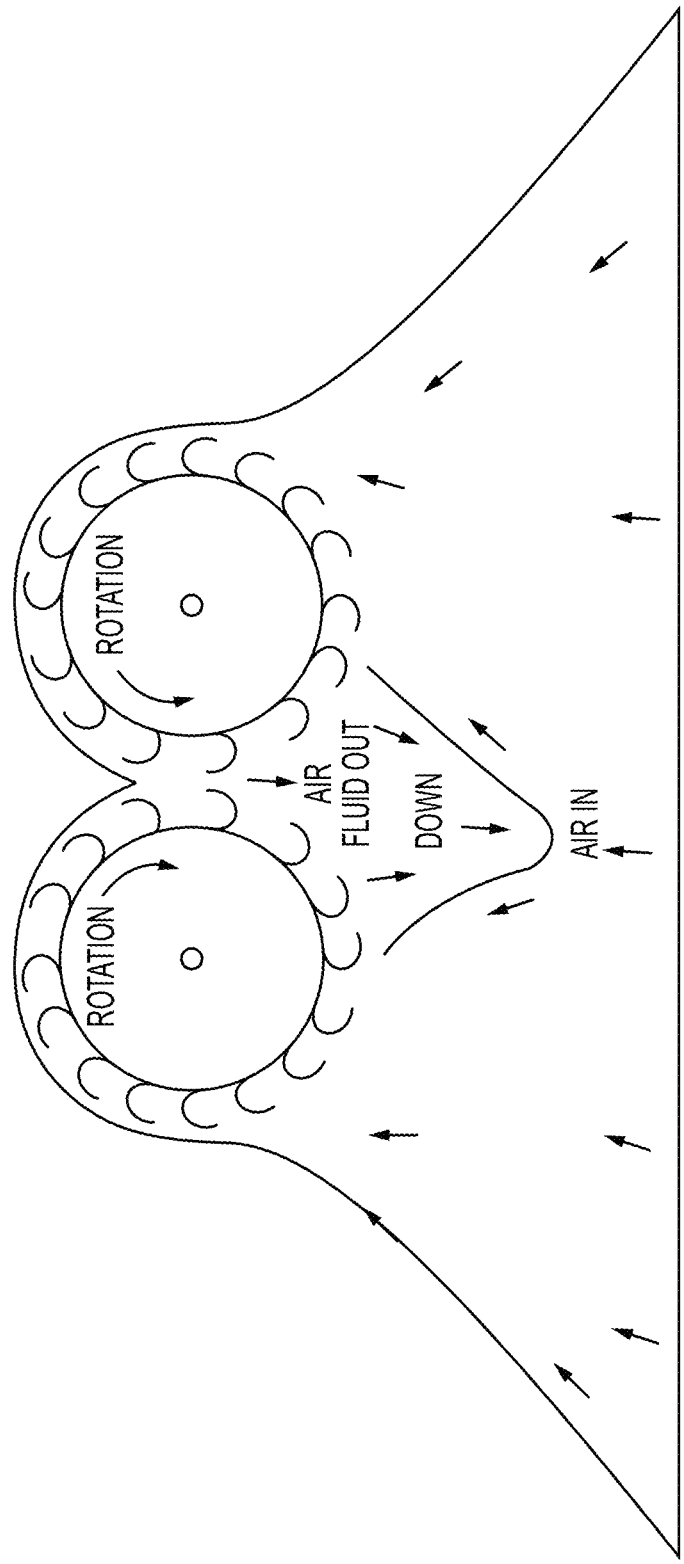
FIG. 3 is a cutaway top view of a side-by side twin rotor configuration according to an embodiment of the present application.
Figure 4:
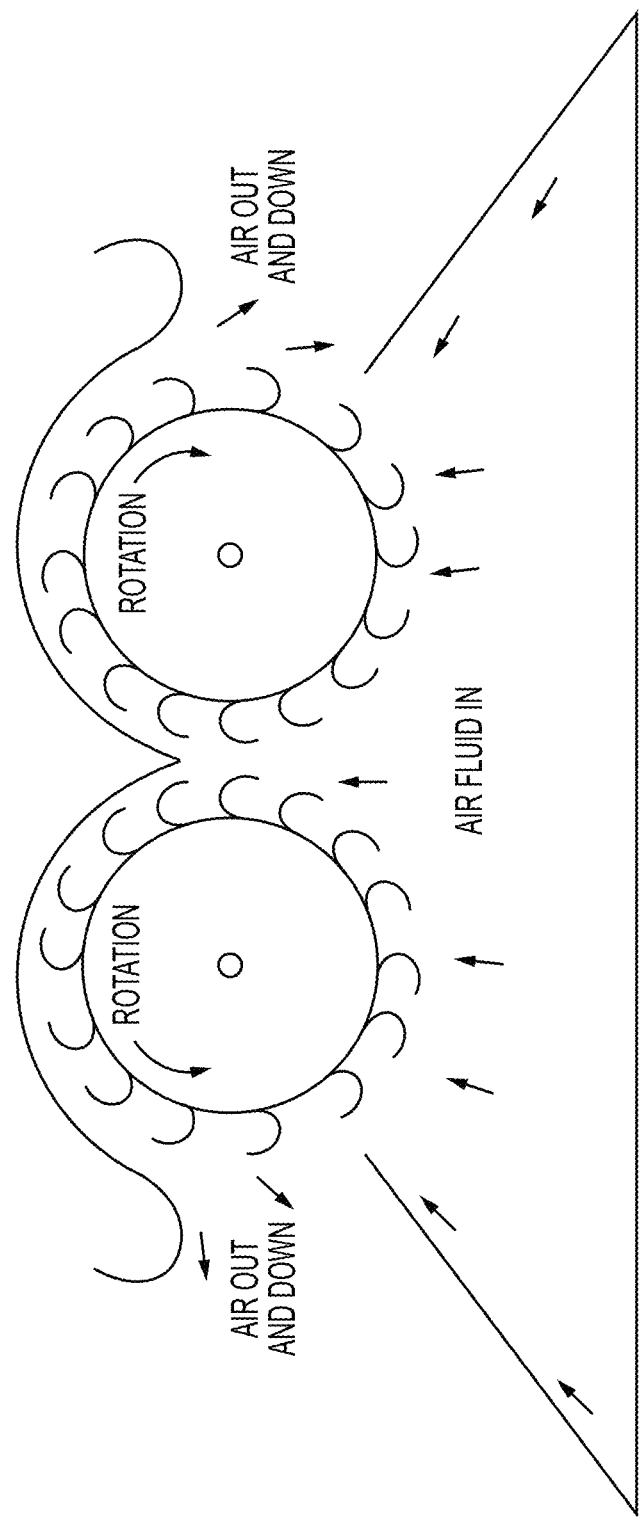
FIG. 4 is a cutaway top view of another side-by side twin rotor configuration according to an embodiment of the present application.

FIGS. 3 and 4 illustrate exemplary side-by-side twin rotor embodiments, each having two separate rotational axes and rotors which are independent of each other. Furthermore, the funnel/housing assembly can share a rotational axis with one of the turbines, with the other turbine being mounted to be carried by and rotate within the funnel housing assembly.

The side-by-side twin turbine devices use the same basic funnel housing fluid stream inlet and exit openings as the single turbine design, with some modifications. In particular, in the FIG. 3 twin turbine embodiment, the air or fluid collected by the funnel is directed to the left and right sides by the internal ducting, so that the turbines spin toward each other from back to front, and the spent air or fluid is exited together in the center of the housing assembly and directed down and out. In the FIG. 4 twin turbine embodiment, the air or fluid collected by the funnel is directed between the two turbines, so that the turbines spin away from each other from front to back, and the spent air is directed out of the assembly from the respective turbines on the respective outer back left and outer back right sides of the housing.

In the side-by-side twin turbine embodiments, the two turbine rotors can either rotate independently of each other or be synced together by a figure eight cog belt or chain arrangement attached to just inside the outer diameter surface of the rotors, just below the blades. Furthermore, both the single and twin turbine funnel assemblies can be mounted high above the ground on a tower or other structure independent of the turbine rotor assembly to save weight, and have the heavy mass turbine rotor assemblies on the ground for easy electrical or mechanical hookup.

Figure 20:
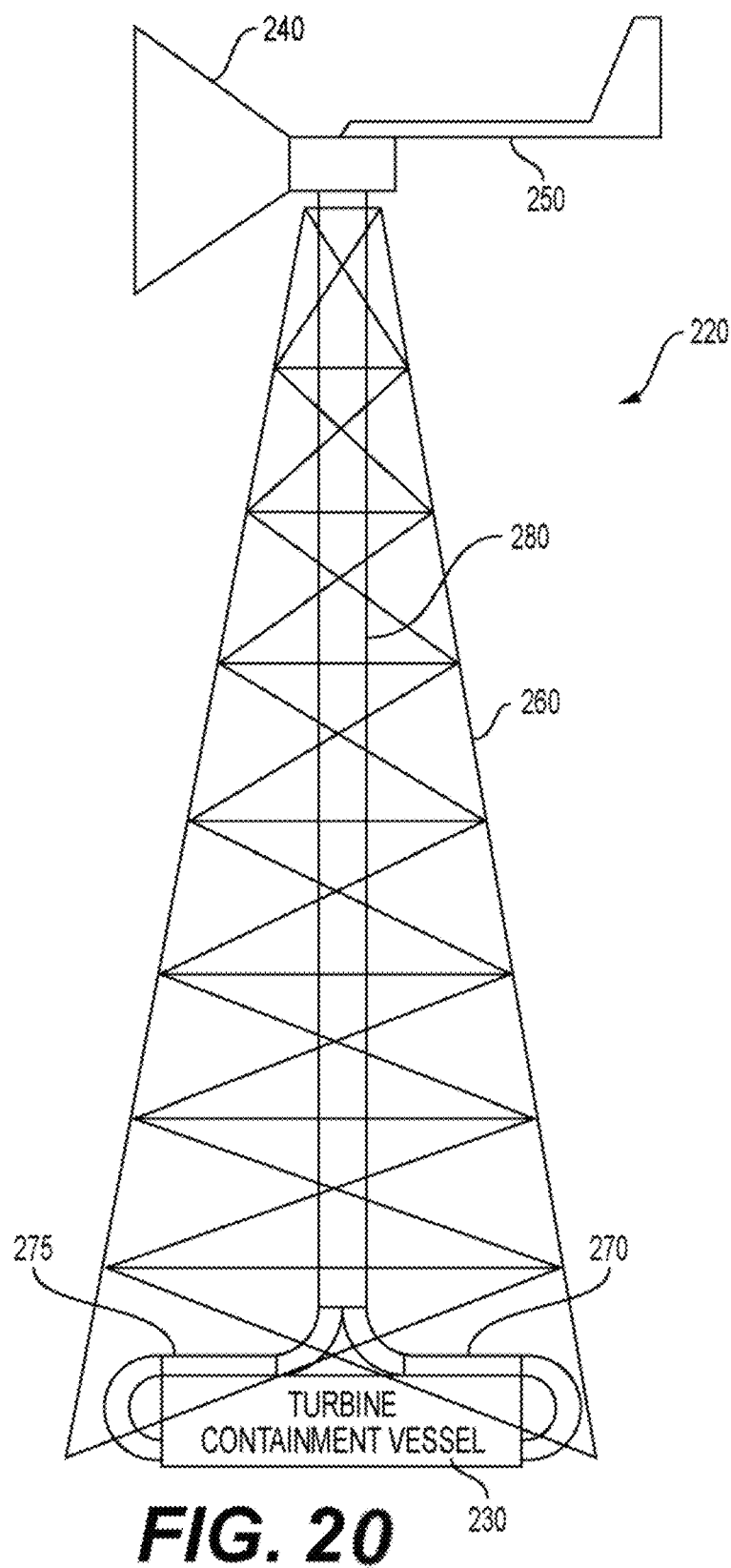
FIGS. 20, 21 and 22 are a respective side view, partial overhead schematic view, and detail schematic partial side view of a wind turbine assembly embodiment including a vertical duct.
Figure 21:
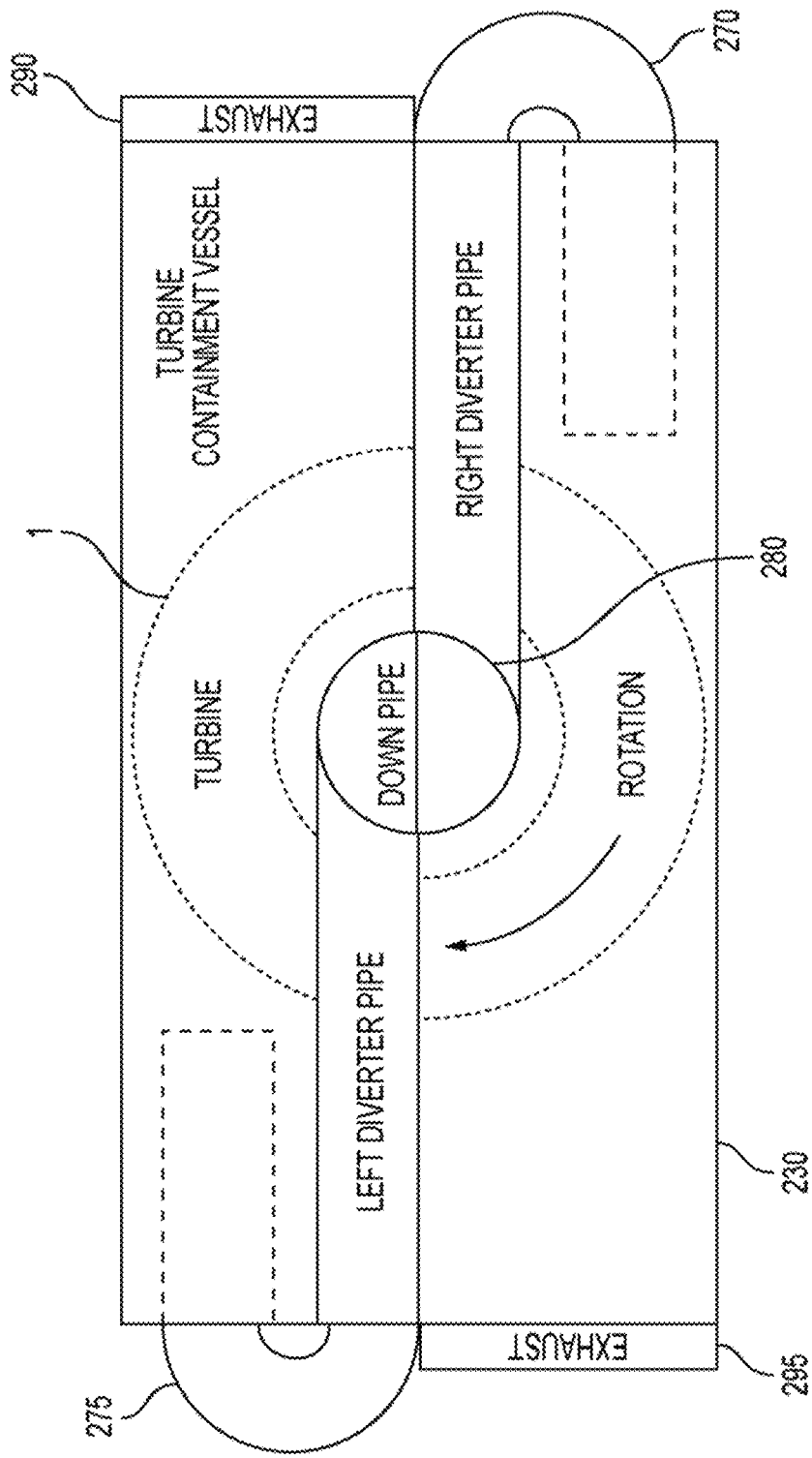
Figure 22:
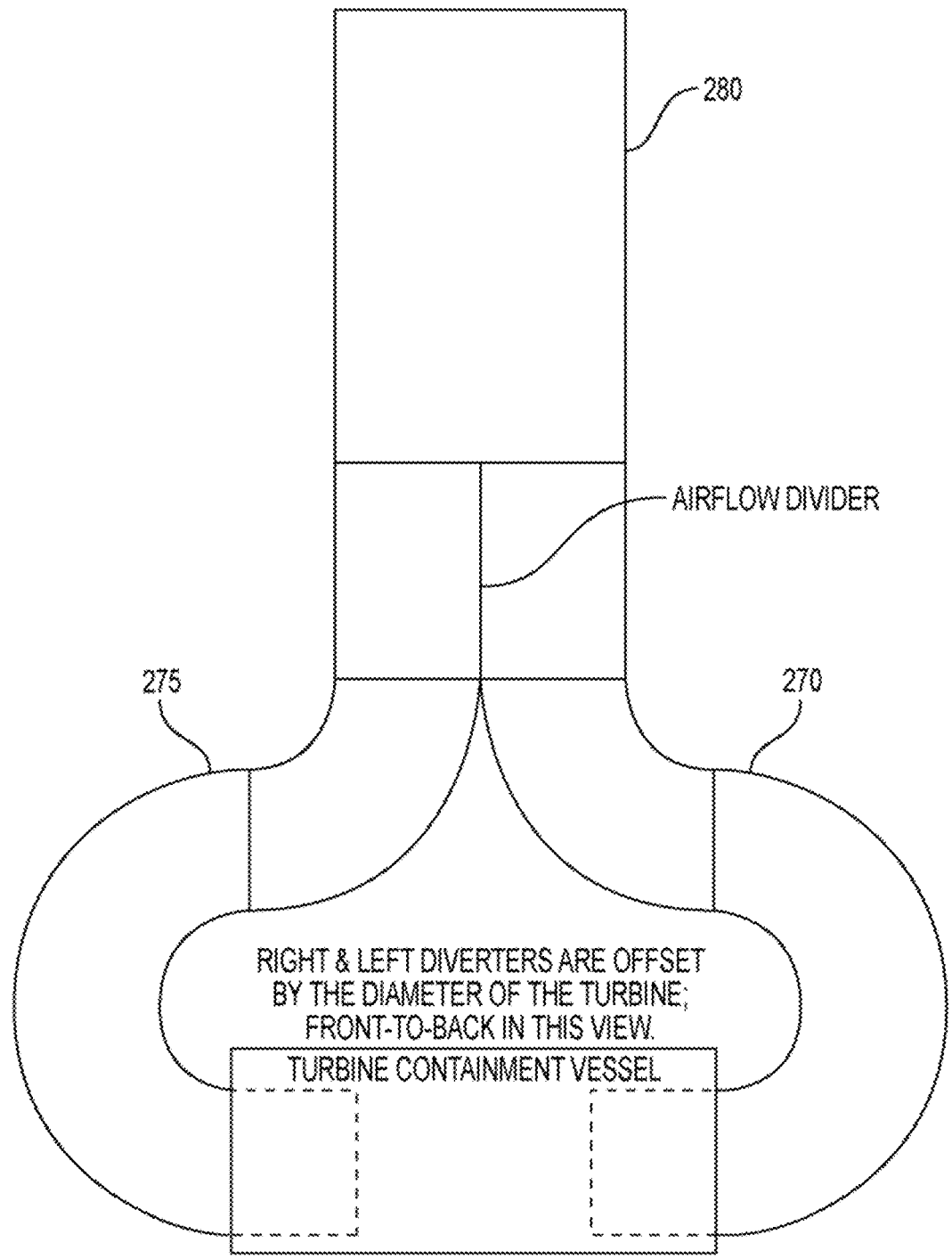

When on a high, e.g., 200 foot high tower, the funnel assembly can have, for example, a two foot diameter flexible or solid tube or duct attached to the funnel assembly rear fluid stream opening, transferring from the funnel horizontal axis to the tube vertical axis to convey fluid stream energy down to the turbine rotor assembly on the ground. The inside surface of the vertical tube and funnel collection surface are embedded with super slippery (PTFE or the like) particles to reduce the friction of the fluid stream so maximum energy can be conveyed and transferred to the special tall curved turbine blades on the ground, in one embodiment. The tower funnel rotates directly into the fluid stream, same as the combined assembly does. For example, the wind turbine assembly 220 illustrated in FIGS. 20-22 includes a fixed housing 230. As in other embodiments, disposed in the housing 230 is a turbine rotor 1 configured to rotate about a vertical axis. Furthermore, there is a funnel 240 configured to rotate about the vertical axis independent of the turbine rotor 1, and a vane 250 configured to cause the funnel 240 to rotate such that its air inlet opening always faces into the wind. The funnel 240 is supported, for example, several hundred feet above the ground by a supporting structure 260, which also supports a fixed vertical duct 280 that delivers the collected wind from the funnel 240 to intake ducts 270 and 275. The intake ducts 270 and 275 each take half of the collected wind and deliver it to the turbine rotor 1 on opposite sides in offset fashion. Furthermore, the spent wind is exhausted at outlets 290 and 295 built into the housing.

If weight is a major problem, and amount of kinetic energy storage from the main turbine rotor assembly is not a concern, and/or the complete collection and production device is required to be high on a tower, the main turbine rotor blade assembly can be hollow and fabricated, for example, from one quarter inch or thinner non-magnetic stainless steel, sprayed up fiberglass or carbon fiber, or molded high strength materials. The hollow turbine rotor assembly can also be pressurized with helium, hydrogen gas mixture, or other lighter-than-air gases. This way it is possible to shed about 90 percent of weight from the turbine rotor blade assembly. Should conditions change, and everything is moved to the ground, where weight is not a factor, the hollow turbine rotor blade assembly can be filled with a heavy liquid, concrete, lead or other heavy mass material. When doing this, extreme care must be used to properly rebalance the turbine rotor blade fabrication assembly.

Figure 5:
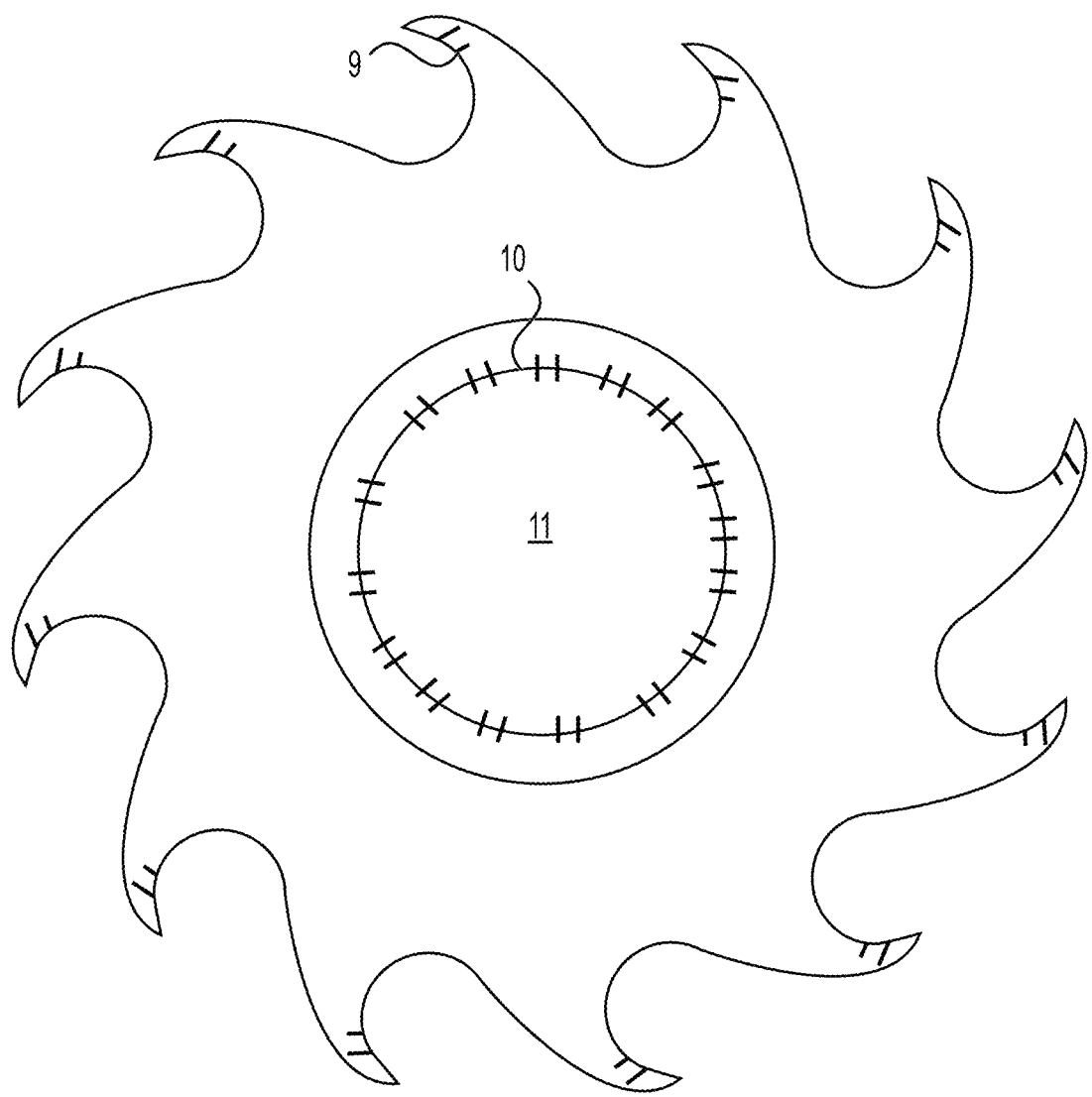
FIG. 5 is a cutaway top view of a configuration with a water enhancement according to an embodiment of the present application.

FIG. 5 illustrates an enhancement to the turbine using water. In particular, small holes 9 are provided in the front curved edge of the full height of each blade. Furthermore, a slipring 10 around a center rotor 11 allows high pressure water to enter the center and travel through the rotor to the blades outer edge. This can increase efficiency or even spin the rotor without outside wind or fluid moving. Such an arrangement can also be used, with almost no changes, in both single and twin turbine versions, and can be configured to provide efficient hydro-electric energy to homes and factories. In this use, the large funnel may be eliminated depending on the volume and pressure at the water inlet opening.

Furthermore, to increase efficiency in very hot dry areas of the world, a number of water jets can be installed on either bottom, top, or both main funnel front surfaces. Such nozzles are adapted to produce a mist in the air to make the air denser, so it pushes harder on the turbine blades. A collection housing at the bottom of the turbine assembly holds the water. A liquid pump can be built as part of the turbine rotor assembly to pressurize funnel nozzles, or a stand-alone pump can be hooked to power take-off pulley to run the pump. Sand or other solid particles can also be used.

In addition to the primary main turbine rotor that stores its own energy, there may be secondary storage motor generator units. Each storage motor generator should be configured to be made of very heavy mass material such as stainless steel, cast iron, glass, steel or similar materials contained inside a very high vacuum vessel which can be made out of high-grade non-magnetic material such as stainless steel, glass, or other non-magnetic high vacuum materials, and may spin at very high rotational speed 5000 or more rpm. The secondary storage generator units can be self-contained motor generators, to be precision balanced, similar to the main turbine rotors.

Using motor generator units instead of generator only units allows the main turbine generator to spin up the secondary storage generators in two or more ways, instead of just one way of direct electromagnetic coupling and decoupling to and from the main turbine rotor. This action is very simple and works very well at high wind or fluid speeds. It may not work as well at low wind or fluid speeds because the main rotor is spinning much slower and cannot give the secondary storage generator its maximum energy charge. To overcome this deficiency, electrical power energy produced by the main turbine rotor may be used to power up the motor on the secondary generators, which is used to spin the generator up to full energy storage capacity at low wind speeds.

Another advantage of the high vacuum motor generator arrangement is that it allows more than just the one direct coupled storage unit. This allows multiple output electrical power circuits and great amounts of diversified electrical storage capacity. This storage method is simple, reliable, and far better than the best batteries which tend to fail in cold weather, because it may be trouble-free for an extended life. The secondary motor generator high vacuum units can last a lifetime when using special low-friction magnetic bearings properly balanced and properly sealed in a high vacuum chamber.

Figure 18:
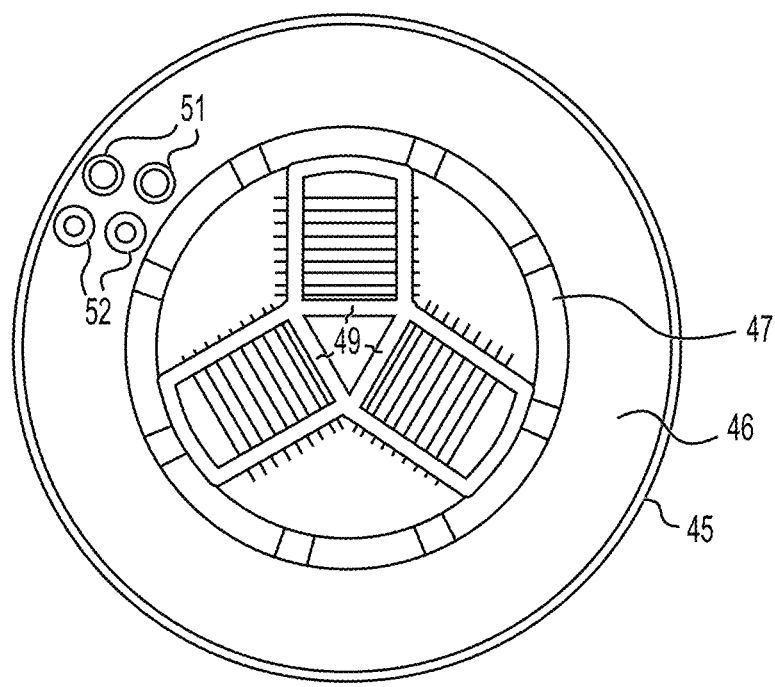
FIG. 18 is a top view of a motor generator arrangement.
Figure 19:
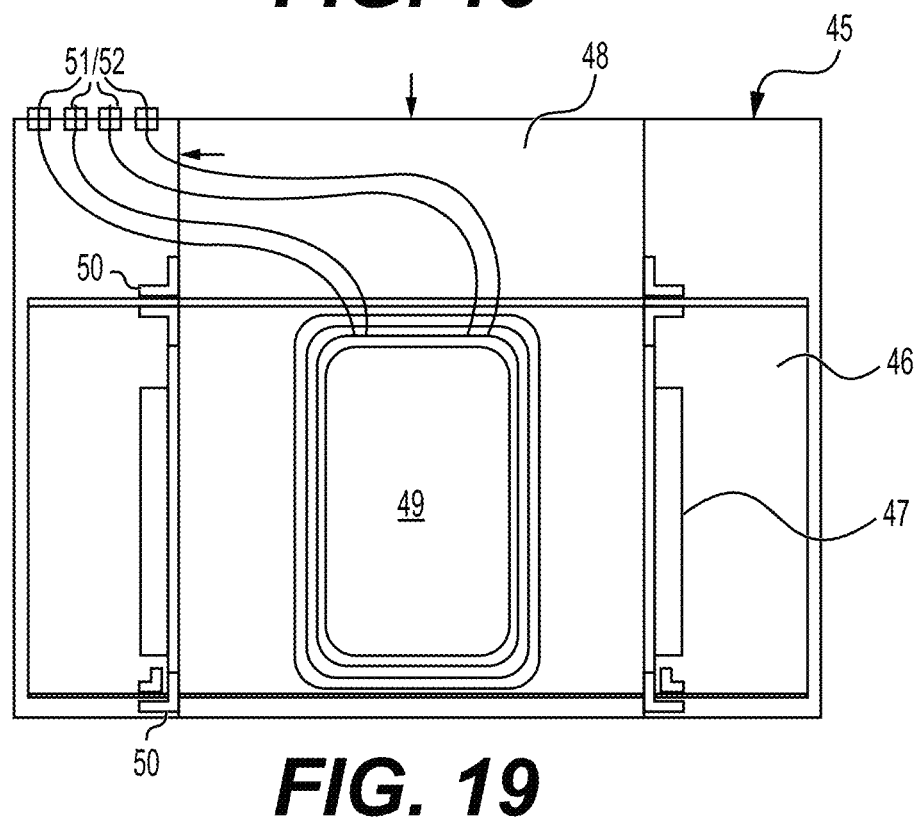
FIG. 19 is a side view of a motor generator arrangement.

As illustrated in FIGS. 18 and 19, the motor generator is disposed in a vacuum chamber 45 of non-magnetic stainless steel. Embedded in the heavy mass steel rotor 46 are special high power ceramic magnets 47. In the center stationary tube 48 are one or more center iron cores 49 around which copper coils are wound. Two separate coils can be wound—one for spinning up and one for power generation. Alternatively, a separate motor can be placed on top of the heavy mass rotor. The rotor spins on high power magnetic bearings 50, the top pair of which attract each other, and the bottom pair of which repel each other. The windings are wired to hermetic glass to metal high vacuum electrical connectors 51 and 52 for main generator power out (connectors 51), and spin up motor in (connectors 52).

Another embodiment first for the secondary storage generator units and main turbine rotor assemblies is they are wound with flat copper iron alloy cladding wire for the windings and super strength ceramic magnets. Standard round copper wire windings and Alnico 5 magnets can be substituted at reduced efficiency.

The main turbine rotor generator is made the same way as the secondary generator, except it need not be disposed in a high vacuum environment. Also separate conventional generators may be placed next to the wind turbine assembly and driven in conventional manner such as by a belt pulley arrangement, chain sprocket arrangement, or gears, or the like, instead of or in combination with the main turbine rotor generator. Further, mechanical power take-off devices can be used by any of the above mentioned ways or more, to extract mechanical energy.

The main turbine rotor can be configured to generate electrical energy in more than one way. A preferable arrangement involves embedding the high-power magnets heightwise in the very center of the main turbine rotor, right next to the stationary rotational axis, where the special flat copper iron alloy cladding rectangular windings are placed. The coil windings are also tall and narrow to match the profile of the magnets. If this arrangement is reversed, then slip-rings need to be used on the main rotor side to convey the electrical power from the generator, for use. One or more magnets can also be used on the bottom and top of the main turbine rotor, and the coil windings on the stationary housing next to the magnets. The tall narrow blades of the turbine rotor are specially curved to collect and hold momentarily the fluid stream particles so the maximum fluid stream energy is transferred to the turbine rotor.

Figure 6:
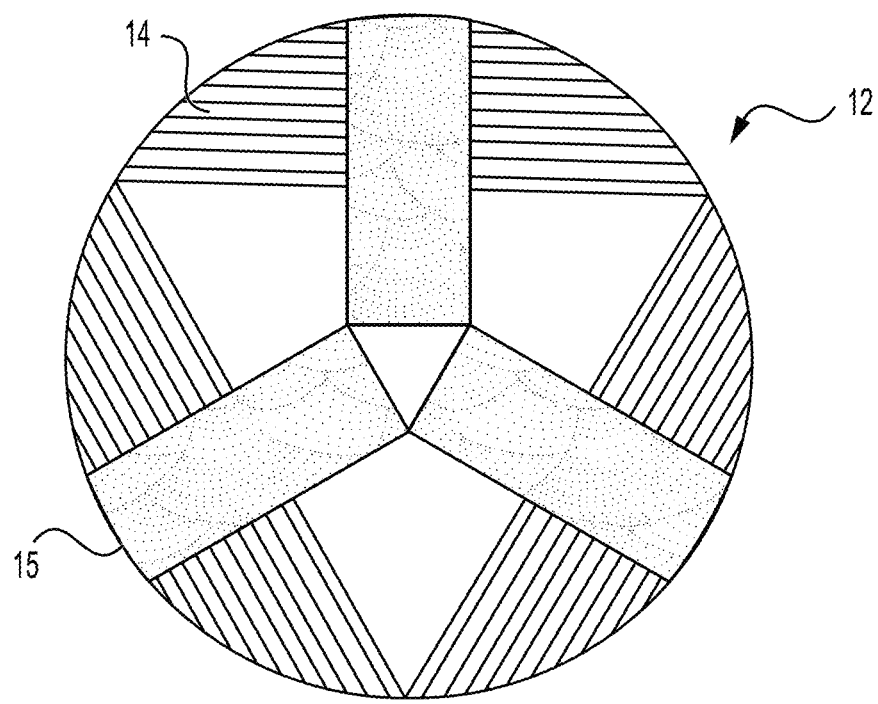
FIG. 6 is a top view of a stationary part of a turbine generator according to an embodiment of the present application.
Figure 7:
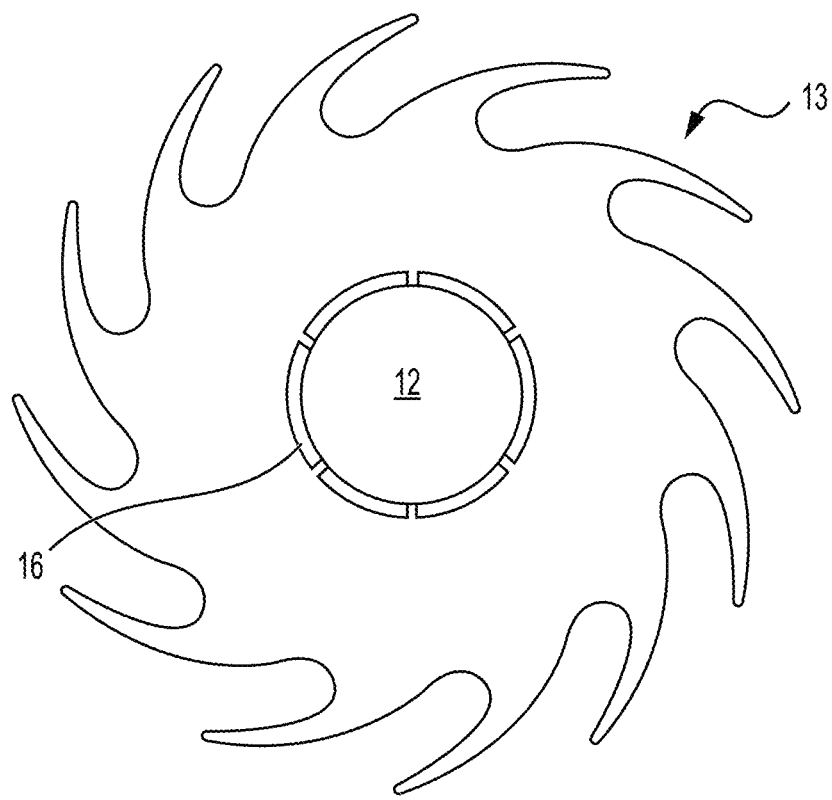
FIG. 7 is a top view of a rotor of a turbine generator according to an embodiment of the present application.

FIGS. 6 and 7 illustrate exemplary components of a single turbine assembly that acts as a generator. In particular, FIG. 6 illustrates a top view of the stationary part 12, around which the turbine 13, a top view of which is illustrated in FIG. 7, rotates. The stationary part 12 includes a plurality (in the embodiment, three) copper windings 14 almost the entire height of the stationary part 12, which are wound around respective (in the embodiment, three) center iron cores 15. Alternatively, copper-iron alloy cladding flat wire windings can be used. Embedded in the turbine 13, to surround the stationary part 12, are a plurality (in the embodiment, six) ceramic magnets 16. The rotation of the turbine 13 will thus generate electricity in the windings 14, which can be transferred external to the generator in a known manner.

Figure 8:
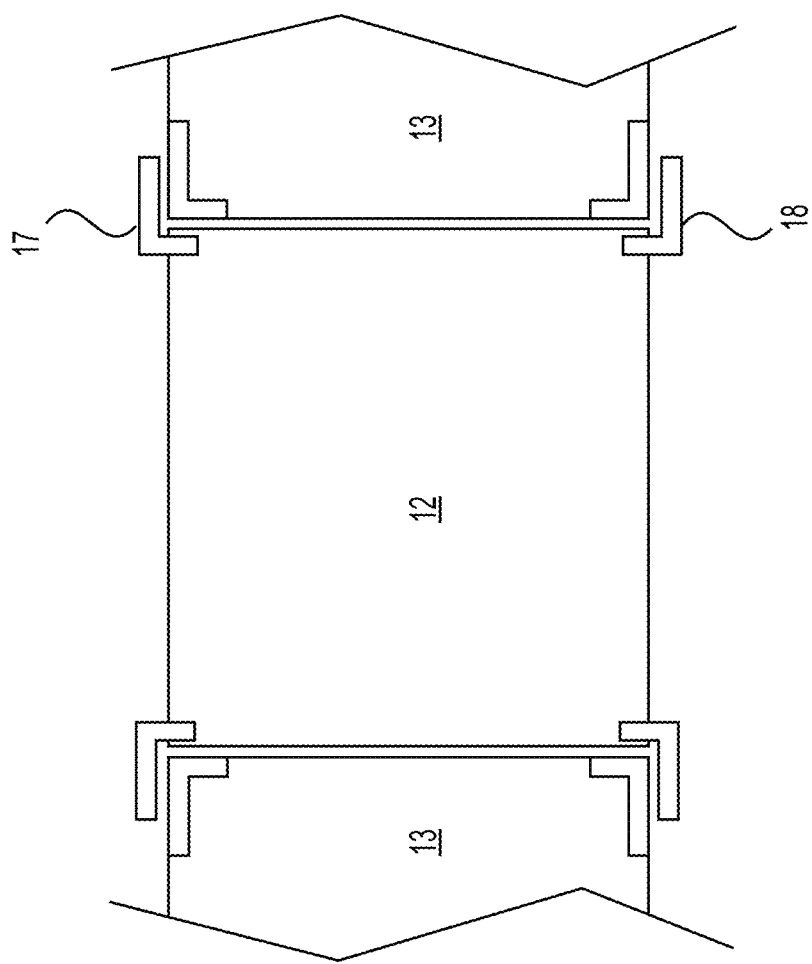
FIG. 8 is a partial side view of a turbine generator according to an embodiment of the present application.

As illustrated in the FIG. 8 partial cutaway side view, the turbine 13 is supported to rotate relative to the stationary part 12 by a top magnetic bearing 17 and a bottom magnetic bearing 18. In the top magnetic bearing 17, the bearing parts are polarized such that the bearing part carried by the stationary part 12 attracts the bearing part carried by the turbine. By contrast, in the bottom magnetic bearing 18, the bearing parts are polarized such that the bearing part carried by the stationary part 12 repels the bearing part carried by the turbine 13. With this configuration, the magnetic bearings 17 and 18 can provide sufficient force to support the turbine 13. Additionally the funnel housing is supported for rotation by the bearing parts carried by the stationary part 12, which interact with additional magnetic bearing parts supported by the funnel assembly.

Another version is the twin turbine vertical slacking version and counter rotation configuration to achieve double generator rpm in low wind or fluid speeds to produce double the power. At low wind or fluid speeds, this vertical stackable version may be the most efficient. This configuration can either use one funnel and direct one fluid stream to each turbine, or stack two funnels, turbine rotor assemblies on top of each other. Stacking two funnel turbine assemblies on top of each other may be the best way to double the electrical power in low wind or fluid conditions. The major difference is the top turbine rotor connects directly to an additional sleeve that slides over the stationary rotational axis and spins coil windings, in a second direction, counterclockwise, while the bottom turbine rotor spins in the first direction, clockwise. The top rotor does not have any magnets. Only the bottom turbine rotor has the magnets embedded in the rotor. The center coil windings now need sliprings on the rotational axis to convey the electrical power generated.

Figure 9:
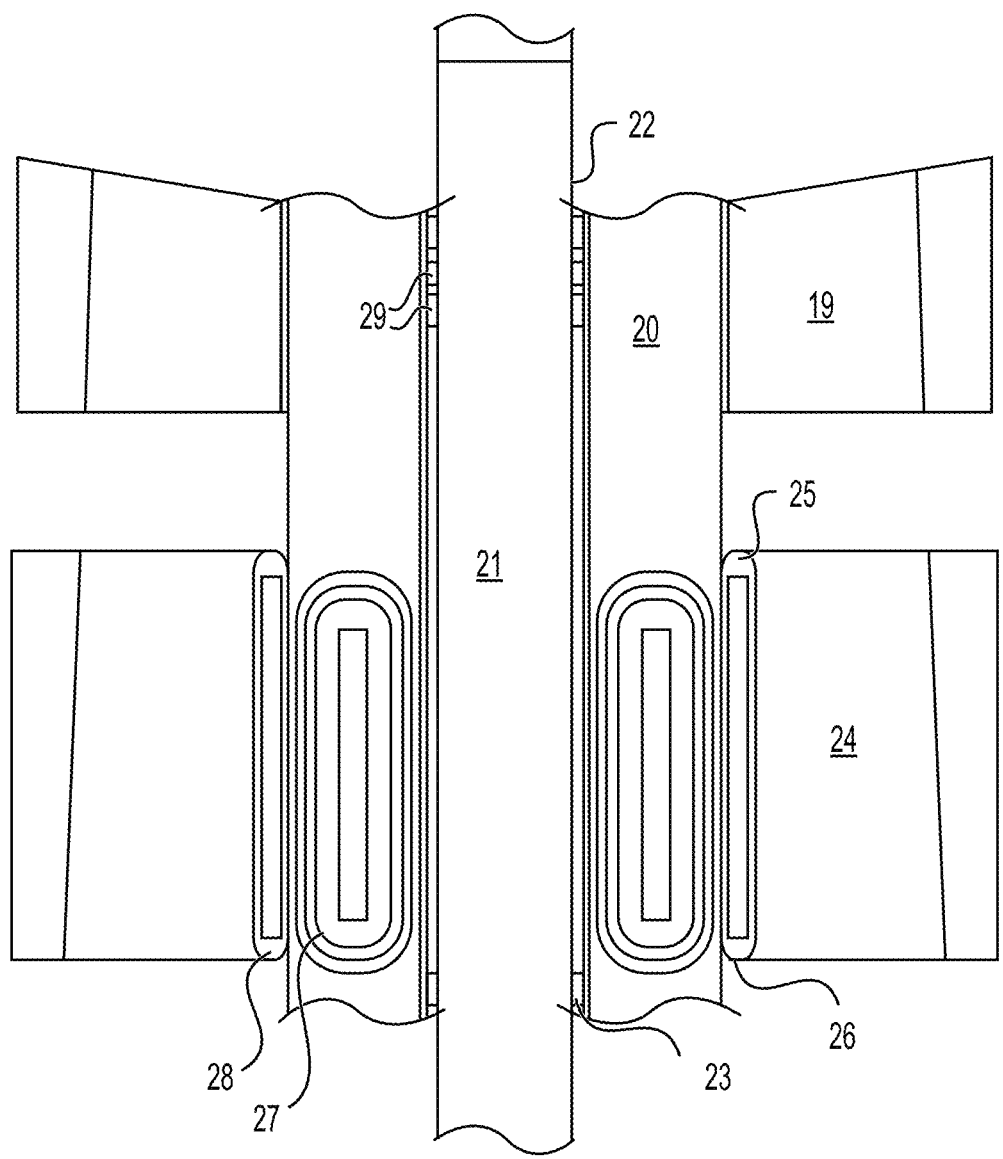
FIG. 9 is a cutaway side view of a stacked twin turbine opposite rotation assembly according to an embodiment of the present application.
Figure 10:
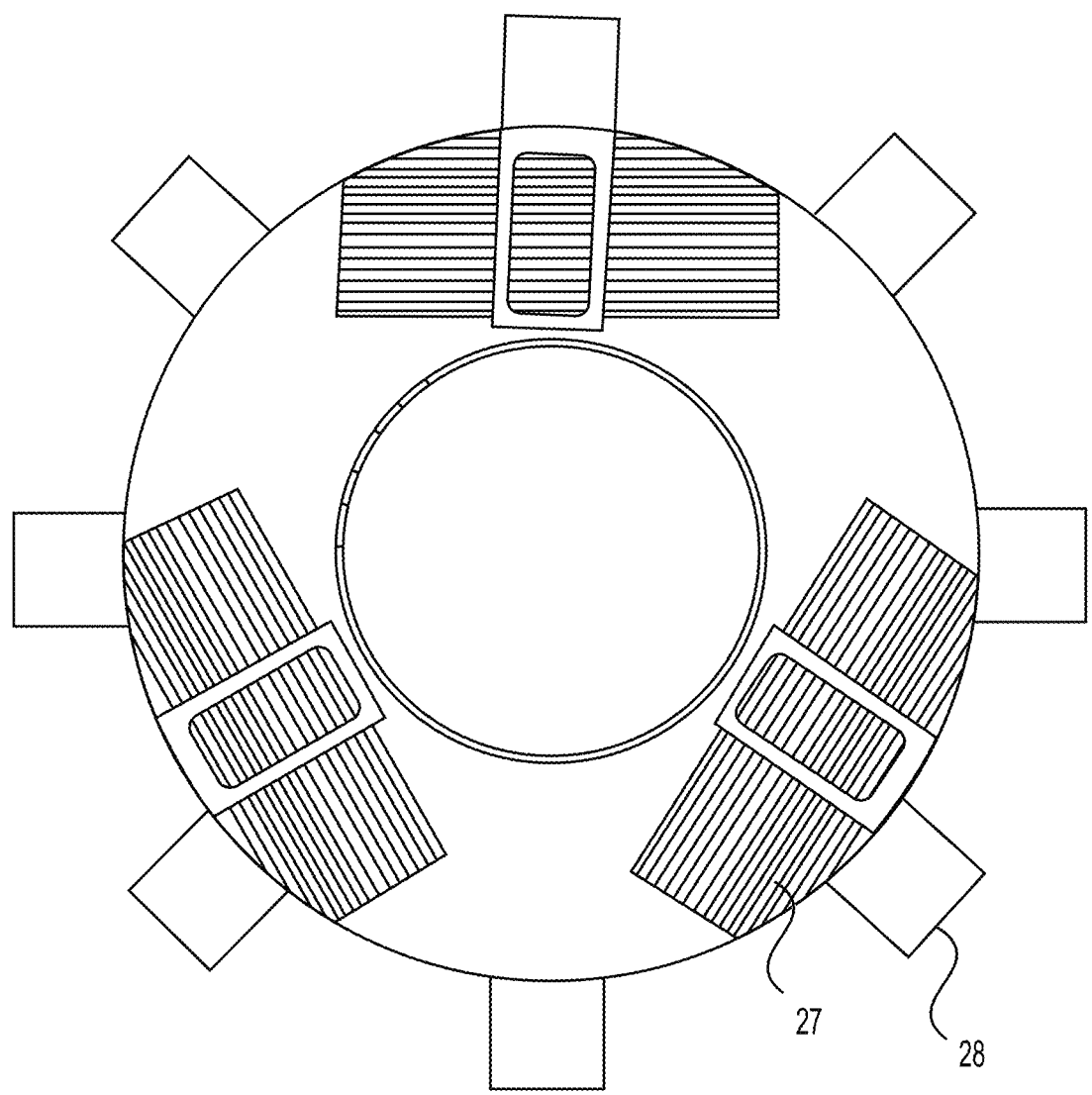
FIG. 10 is a partial cutaway top view of a stacked twin turbine opposite rotation assembly according to an embodiment of the present application.

FIGS. 9 and 10 illustrate a stacked twin rotor embodiment configured for doubling the relative generator speed and thus correspondingly increasing the electricity generation. As illustrated in the FIG. 9 cutaway side view, a first rotor 19, which is fixed to a sleeve 20, is configured such that the first rotor 19 and sleeve 20 are supported to rotate together relative to a fixed central axis 21 by a first top magnetic bearing 22 and a first bottom magnetic bearing 23, while a second rotor 24 is configured such that it is supported to rotate relative to the sleeve 20 by a second top magnetic bearing 25 and a second bottom magnetic bearing 26. The magnetic bearings 22, 23, 25 and 26 are similar to the magnetic bearings 17 and 18 of the embodiment of FIGS. 6-8.

The blades of the respective first and second rotors 19 and 24 are oriented oppositely, in other words, as if one of the rotors is flipped relative to the other. The rotors 19 and 24 thus will spin in opposite directions. One or more funnel assemblies (not shown for ease of understanding) designed corresponding to the configurations discussed above are used to direct fluid to the rotors 19 and 24. The rotors 19 and 24 can share a common funnel assembly or use separate funnel assemblies.

Embedded in the sleeve 20 are a plurality of windings/core assemblies, or windings, configured similarly to those of the stationary part 12 in the embodiment of FIGS. 6-8, while embedded in the second rotor 24 are a plurality of ceramic magnets 28. The relative rotation of the first and second rotors 19 and 24 in opposite directions will thus generate electricity in the windings 27. The generated electricity in the windings 27 is transferred to sliprings 29 that are between the sleeve 20 and the fixed central axis 21 via internal wiring in the sleeve 20, for further transfer by internal wiring in the fixed central axis 21.

These devices are scalable and can be mass produced in all sizes. For example, a very small unit a foot or so in diameter is built to charge batteries on electric vehicles while moving or stationary. A large turbine rotor 200 feet in diameter could provide electrical energy for a small town. A medium size turbine rotor 8 feet in diameter and 3 feet high could provide electrical energy for most houses and small businesses. The main funnel for this size turbine rotor would be a main solid fixed funnel about 10 feet deep (front to back) by 15 feet high and 30 feet wide. The attached controllable variable extendable funnel can be a lot larger. The 8-foot diameter turbine rotor can produce over 100 kilowatts of electrical energy AC or DC.

The detailed description above describes embodiments of wind, fluid turbine assemblies. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A fluid stream energy conversion apparatus comprising:
one or more turbines mounted inside a housing and configured to rotate about one or more rotational axes, the turbine including a rotor and a plurality of blades which protrude from an outer surface of the rotor, and a main funnel having front inlet and exhaust openings and configured to collect and compress a fluid stream through the front inlet opening, wherein the fluid stream energy conversion apparatus is configured to direct the fluid stream collected by the main funnel, wherein an extendable part of the main funnel includes an adjustable inlet surface area means preset in an extended position configured to expand an inlet surface area of the main funnel and configured to reduce the inlet surface area according to predetermined set fluid flow values by retracting the extendable part of the main funnel, wherein the adjustable inlet surface area means includes panels which fold back by origami technique or slide back or includes a sail of flexible material having a surface and configured to roll back when the pressure of the fluid stream reaches a predetermined setting.

2. The fluid stream energy conversion apparatus according to claim 1, further comprising a generator mechanically connected to the one or more turbines to generate electrical energy as the one or more turbines rotate about the one or more rotational axes.

3. The fluid stream energy conversion apparatus according to claim 1, further comprising means to direct the main funnel to rotate such that the front inlet opening always faces directly into the fluid stream.

4. The fluid stream energy conversion apparatus according to claim 1, wherein one of said one or more turbines is a main turbine wherein the main turbine generates kinetic energy, further comprising a high vacuum chamber and an electric generator contained in the high vacuum chamber and wherein said main turbine is configured to be electromagnetically coupled and decoupled with the electric generator to store kinetic energy generated by the main turbine.

5. The fluid stream energy conversion apparatus according to claim 1, further comprising a grid, said grid comprising a structural part of the funnel front configured to reinforce the main funnel in strong wind conditions.

6. A fluid turbine assembly comprising:
a circular housing;
one or more turbines placed inside the housing and configured to rotate about a rotational axis, the one or more turbines including a rotor and a plurality of blades which protrude from an outer surface of the rotor;
a single funnel configured to collect and compress fluid stream energy through a fluid inlet opening; and
wherein an extendable part of the funnel includes an adjustable inlet surface area means preset in an extended position configured to expand an inlet surface area of the funnel and configured to reduce the inlet surface area according to predetermined set fluid flow values by retracting the extendable part of the funnel,
wherein the adjustable inlet surface area means includes panels which fold back by origami technique or slide back or includes a sail of flexible material having a surface and configured to roll back when the pressure of the fluid stream reaches a predetermined setting; and
a ducting part of the funnel configured to direct the collected fluid stream energy into the housing and toward the turbine blades in a first direction, and to direct the collected fluid stream energy into the housing and toward the turbine blades in a second direction opposite the first direction at the same time;
wherein the funnel is configured to rotate on the same axis independently of the turbine blades,
wherein the circular housing has ducting walls which separate, compress, direct, and recombine the fluid stream energy in opposite directions.

7. The fluid turbine assembly according to claim 6, further comprising a vertical tube or duct connected to the funnel assembly which may be 200 feet above ground, separate from main turbine assembly.

8. The fluid turbine assembly according to claim 6, further comprising a continuous smooth fluid pathway around the rotor, which allows the one or more turbines to rotate by collecting fluid stream energy continuously 300 degrees around the rotor.

9. The fluid turbine assembly according to claim 8, wherein all critical surfaces are embedded with PTFE substance to reduce friction.

10. The fluid turbine assembly according to claim 6, further comprising a funnel configured to direct the fluid stream energy into the housing in the first direction to the left toward the turbine blades; the housing further comprising an intake ducting portion of the funnel and configured to direct the collected fluid stream energy into the housing toward the turbine blades in a second direction opposite the first direction, at the same time.

11. The fluid turbine assembly according to claim 6, further comprising a large protrusion molded into the housing top and rear to direct the funnel to align directly into the oncoming fluid stream energy in the first and second directions.

12. The fluid turbine assembly according to claim 6, further comprising one of the rotors of the one or more turbines having a substantial storage mass contained inside a high vacuum, non-magnetic chamber, so the mass can store kinetic energy when electromagnetically coupled to another rotor, then decoupled to store the kinetic energy, plus use the generator as a motor for full charge in low wind and fluid stream conditions.

13. A method of converting fluid stream energy into mechanical energy, comprising:
collecting and compressing via a funnel into a surround housing which creates two fluid streams; and
wherein an extendable part of the funnel includes an adjustable inlet surface area means preset in an extended position configured to expand an inlet surface area of the funnel and configured to reduce the inlet surface area according to predetermined set fluid flow values by retracting the extendable part of the funnel,
wherein the adjustable inlet surface area means includes panels which fold back by origami technique or slide back or includes a sail of flexible material having a surface and configured to roll back when the pressure of the fluid stream reaches a predetermined setting
immediately pushing, by a first fluid stream, on special curved tall turbine rotor blades of one or more turbine rotors, the blades collecting and momentarily holding fluid stream energy particles, and causing the turbine rotor or rotors to absorb additional fluid stream energy which converts into mechanical energy, which causes the rotors to spin;
causing a second fluid stream to travel about 180 degrees around a circular housing, speeding up before merging with the first fluid stream which further compresses, causing additional fluid stream energy to be absorbed into the turbine rotor or rotors from the opposite direction; and
finishing a fluid stream travel and exiting the housing at about 300 degrees, around the turbine rotor.

14. The method according to claim 13, wherein the mechanical energy produced can be used for power take-off applications, while built-in turbine rotor magnets interact with stationary flat copper/iron alloy cladding coil windings to convert the mechanical energy into electrical power energy, which is stored by the one or more turbine rotors and used as needed.

* * * * *